US008073659B2

(12) United States Patent
Gugaliya et al.

(10) Patent No.: US 8,073,659 B2
(45) Date of Patent: Dec. 6, 2011

(54) DECOMPOSITION OF NONLINEAR DYNAMICS USING MULTIPLE MODEL APPROACH AND GAP METRIC ANALYSIS

(75) Inventors: Jinendra K. Gugaliya, Bangalore (IN); Ravindra D. Gudi, Bangalore (IN); Jinyi Mo, Shanghai (CN); Guan Tien Tan, Penang (MY)

(73) Assignee: Honeywell International Inc., Morristown, NJ (US)

( * ) Notice: Subject to any disclaimer, the term of this patent is extended or adjusted under 35 U.S.C. 154(b) by 807 days.

(21) Appl. No.: 11/939,146

(22) Filed: Nov. 13, 2007

(65) Prior Publication Data

US 2009/0125285 A1    May 14, 2009

(51) Int. Cl.
*G06F 17/10* (2006.01)
(52) U.S. Cl. ........................................................ 703/2
(58) Field of Classification Search .................. 703/2
See application file for complete search history.

(56) References Cited

U.S. PATENT DOCUMENTS
2005/0149209 A1    7/2005    Wojsznis et al.

OTHER PUBLICATIONS

U. Kaymak et al., "Compatible cluster merging for fuzzy modeling", 1995, International Joint Conference of the Fourth IEEE International Conference on Fuzzy Systems and the Second International Fuzzy Engineering Symposium, pp. 897-904.*
Jialin Liu, "modeling a large-scale nonlinear system using adaptive takagi-sugeno fuzzy model on PCA subspace", Dec. 16, 2006, Industrial & Engineering Chemistry Research, vol. 46, pp. 788-800.*
National Instruments, "Stimulus and acquisition considerations in the system identification process", Nov. 5, 2006, downloaded from the Wayback Machine from the archive dated Nov. 5, 2006, pp. 1-6.*
Erdem Arslan et al., "Multi-model control of nonlinear systems using closed-loop gap metric", 2004, Proceeding of the 2004 American Control Conference, pp. 2374-2378.*
Janos Abonyi et al., "Modified gath-geva fuzzy clustering for identification of takagi-sugeno fuzzy models", 2002, IEEE Transactions on Systems, Man, and Cybernetics, vol. 32, No. 5, pp. 612-621.*
Raghu Krishnapuram et al., "The fuzzy C spherical shells algorithm: a new approach", 1992, IEEE Transactions on Neural Networks, vol. 3, No. 5, pp. 663-671.*
Ning Li et al., "Multi-model predictive control based on the takagi-sugeno fuzzy models: a case study", 2004, Information Sciences, vol. 165, pp. 247-263.*
John Yen et al., "Application of statistical information criteria for optimal fuzzy model construction", 1998, IEEE Transactions on Fuzzy Systems, vol. 6, No. 3, pp. 362-372.*
Michio Sugeno et al., "A Fuzzy-Logic-Based Approach to Qualitative Modeling", 1993, IEEE Transactions on Fuzzy Systems, vol. 1, No. 1, pp. 7-31.* K.S. Narendra "Adaptive Control Using Multiple Models", IEEE Transactions on Automatic Control, vol. 42, No. 2, Feb. 1997, pp. 171-187.
O. Galan et al., "Gap Metric Concept and Implications for Multilinear Model-Based Controller Design", Ind. Eng. Chem. Res. 2003, 42, pp. 2189-2197.
A.F. Gomez-Skarmeta et al., "About the use of fuzzy clustering techniques for fuzzy model identification", ELSEVIER Fuzzy Sets and Systems 106 (1999), pp. 179-188.

* cited by examiner

*Primary Examiner* — Paul Rodriguez
*Assistant Examiner* — Russ Guill
(74) *Attorney, Agent, or Firm* — Schiff Hardin LLP (57) ABSTRACT

Multiple models for various stages of a non-linear process control are developed by clustering perturbation data obtained from the nonlinear process so as to permit multiple local data regions to be identified as a function of substantial similarity between the data, wherein the data of first data set represent the non-linear process. A discrete model corresponding to each of the local data regions is generated. The number of the discrete models may be reduced as a function of prediction error between actual outputs of the process and predicted outputs of the models and as a function of a gap metric based on closed loop similarity and frequency response similarity between the models.

9 Claims, 6 Drawing Sheets

| Initial Data | Transformed Data |
|---|---|
| y(1) u(1) | y(1) y(0) u(0) |
| y(2) u(2) | y(2) y(1) u(1) |
| y(3) u(3) | y(3) y(2) u(2) |
| ⋮ ⋮ | ⋮ ⋮ ⋮ |
| y(n) u(n) | y(n) y(n-1) u(n-1) |

DECOMPOSITION OF NONLINEAR DYNAMICS USING MULTIPLE MODEL APPROACH AND GAP METRIC ANALYSIS

TECHNICAL FIELD

The present application discloses the identification of models for model based process control of nonlinear processes.

BACKGROUND

Model based process control methods are typically deployed for flexible operation and improved productivity of a number of processes such as those related to chemicals, polymers, natural gas processing, pharmaceuticals, microelectronics, and pulp and paper industries. These processes often require product grade transitions to fulfill customer needs and to reap benefits of market dynamics.

Because such a flexible mode of operation is required, many processes need to be transitioned and regulated over a broad range of operating conditions. Because the dynamics of such processes change significantly during such transitions, the underlying dynamic models used in the controller need to be updated. It is desired that this updating result in the deployment of high fidelity models which will help to consistently improve productivity, flexible operability, safety, and profitability of the operating units.

Model Predictive Control (MPC) technology is quite popular in refineries where the process usually operates at steady state and the process dynamics can be adequately represented by linear models. However, there are important instances in other adjacent industries (such as those involving chemicals, polymers, natural gas processing, pharmaceuticals, microelectronics, and pulp and paper) where linear models do not adequately represent the process dynamics. These processes are either highly nonlinear at a particular steady state (e.g., pH control) or involve frequent process transitions from one operating point to another (e.g., grade transition in polymer industries, etc.).

It is highly desirable to regulate these processes at an operating point and to transition them from one operating point to another in an optimal and controlled manner. Such controlled and optimal transitions can deliver many economic incentives such as reduced transition times, reduced amounts of off-spec products, optimal utility consumptions, etc. To achieve controlled and optimal regulation and transition of these processes, nonlinear model predictive control is more suited to address the issue of process nonlinearity.

The nonlinear model predictive control that is recommended for regulation of such processes uses either nonlinear dynamic models or successively linearized dynamic models of the processes. However, the nonlinear dynamic models that are used are generally very complex, difficult, and expensive to build because they are based on the first principles (underlying mass, energy and momentum conservation equations) governing the process. Moreover, nonlinear model predictive control has to solve a suitably formulated optimization problem, which is well known to those skilled in the art, in real time at every control execution interval. The use of complex nonlinear models for nonlinear model predictive control can lead to numerical and computational issues. In some cases, the solution of the optimization problem can become infeasible or non-optimal.

An alternative approach that is attractive and that potentially solves such problems is to decompose the nonlinear dynamics into multiple linear models, and then switch smoothly among the models based on the current state of the process. In such a case, the nonlinear model predictive control optimization problem based on linearized models becomes better structured and can be solved quickly and in real time. However, this approach requires the building of a library of linear dynamic models spanning the expected range of operation.

As a practical matter, the identification of the models to be used in the control is a data driven procedure. In general, model identification requires the application of properly designed perturbation signals that perturb the nonlinear process in the expected range of operation. Measurements of the manipulated variables (MVs), disturbance variables (DVs), and controlled variables (CVs) of the process during perturbation are collected as the process output data and are subjected to data based modeling.

It is highly important to keep the process within safety limits during such perturbations. Data based model identification is important to the success of nonlinear model predictive control. For the identification of multiple models, model identification as proposed herein should address such issues as (i) the selection of the number of local models, (ii) the development of the local models, (iii) the switching strategy to be implemented in switching between the models when the models are deployed online, and/or (iv) the closed loop stability when the models are switched.

Various approaches of model de-composition of nonlinear dynamic processes have been attempted. One approach has been proposed by Wojsznis, et al. U.S. Patent Application Publication No. US 2005/0149209 "Adaptive Multivariable Process Controller Using Model Switching and Attribute Interpolation." The approach used by Wojsznis is to perform interpolation between local model parameters based on some heuristics and model validity measures. However, the heuristic based approach is inadequate for a wide variety of applications. This approach also assumes homogeneity of the local models and linear interpolation of the model parameters, an assumption that is not always valid.

An alternative approach is proposed by Narendra K., and Balakrishnan J. in "Adaptive control using multiple models", IEEE Trans. on Auto. Cont., 42(2), 171-187, (1997). However, this approach assumes availability of knowledge of various operating regions, their ranges, and their centers, an assumption that is again not always valid.

Gomez Skarmeta, A., F., Delgado M., and Vila M., A., have proposed a fuzzy classification based multi model decomposition approach in "About the use of fuzzy clustering techniques for fuzzy model identification", Fuzzy sets and Systems, 106, 179-188, (1999). However, this approach does not consider stability in selecting the optimal number of local models.

Galan et al., in "Gap Metric Concept and Implications for Multilinear Model-Based Controller Design," Ind. Eng. Chem. Res., Vol. 42, pp. 2189-2197, (2003), have applied the stability analysis in selecting the optimal number of local models in their paper. However, in this approach, the local models are not obtained via data based modeling but are developed using linearization of first principle based model.

Moreover, none of the above approaches has considered a smooth switching strategy for the selected local models.

The present invention overcomes one or more of these or other problems.

BRIEF DESCRIPTION OF THE DRAWINGS

These and other features, aspects, and advantages of a model decomposition procedure will become better understood when the following detailed description is read with reference to the accompanying drawings in which.

DETAILED DESCRIPTION

A computer method for the offline nonlinear identification of process models is disclosed herein. The nonlinear process model identification is performed by systematically decomposing the CV-MV-DV (controlled variable-manipulated variable-disturbance variable) space into multiple hyper planes, each represented by a local linear model. Such space decomposition is accomplished based on fuzzy classification where the identified hyper planes (local linear models) have fuzzy boundaries.

The CV-MV-DV ranges in which the identified local models have correspondingly good prediction powers are established by this method. Moreover, this method also ensures gradual switching of the local linearized models when the process transitions from one operating steady state to another by using the composite predictions of underlying local models weighted by their gradually changing membership values. The issue of selecting the number of local models to be identified is also addressed.

Typically, fuzzy classification algorithms are used with high numbers of local models (the number is decided upon based on identification data size). However, such a high number of local models can make the nonlinear control design problem complex and difficult to maintain online. Therefore, a systematic approach to reduce the number of local linearized models without compromising closed loop stability and prediction quality of the composite models is used. Also, a robust way of updating the model for online control problem is provided.

Explicit use of stability considerations in the partitioning/decomposition of the nonlinearity as well as a Monte Carlo method based fuzzy classification framework are considered.

Stability considerations are explicitly used in the partitioning/decomposition of the nonlinear process. Since the local models are used in closed loop control, it is highly important to ensure that the models, along with the local controller, provide for closed loop stability. Accordingly, a gap metric is used to measure the stability of the dynamic models from a closed loop stability view-point. Earlier approaches towards nonlinearity decomposition ignored this stability aspect and, therefore, are relatively more likely to yield models that cause instability.

Smooth transitions between, or composition of, the local models is important during online operation to ensure continuity and bumpless behavior. A fuzzy classification framework is used to promote this desirable feature. Traditional methods for fuzzy clustering and classification are prone to generate local optima, and may even fail to generate any meaningful data clusters for high dimensionality in the system dynamics. To overcome this drawback, a novel Monte Carlo simulation based method is proposed to achieve global optima and the optimal segregation of nonlinear dynamics.

Figure 1:
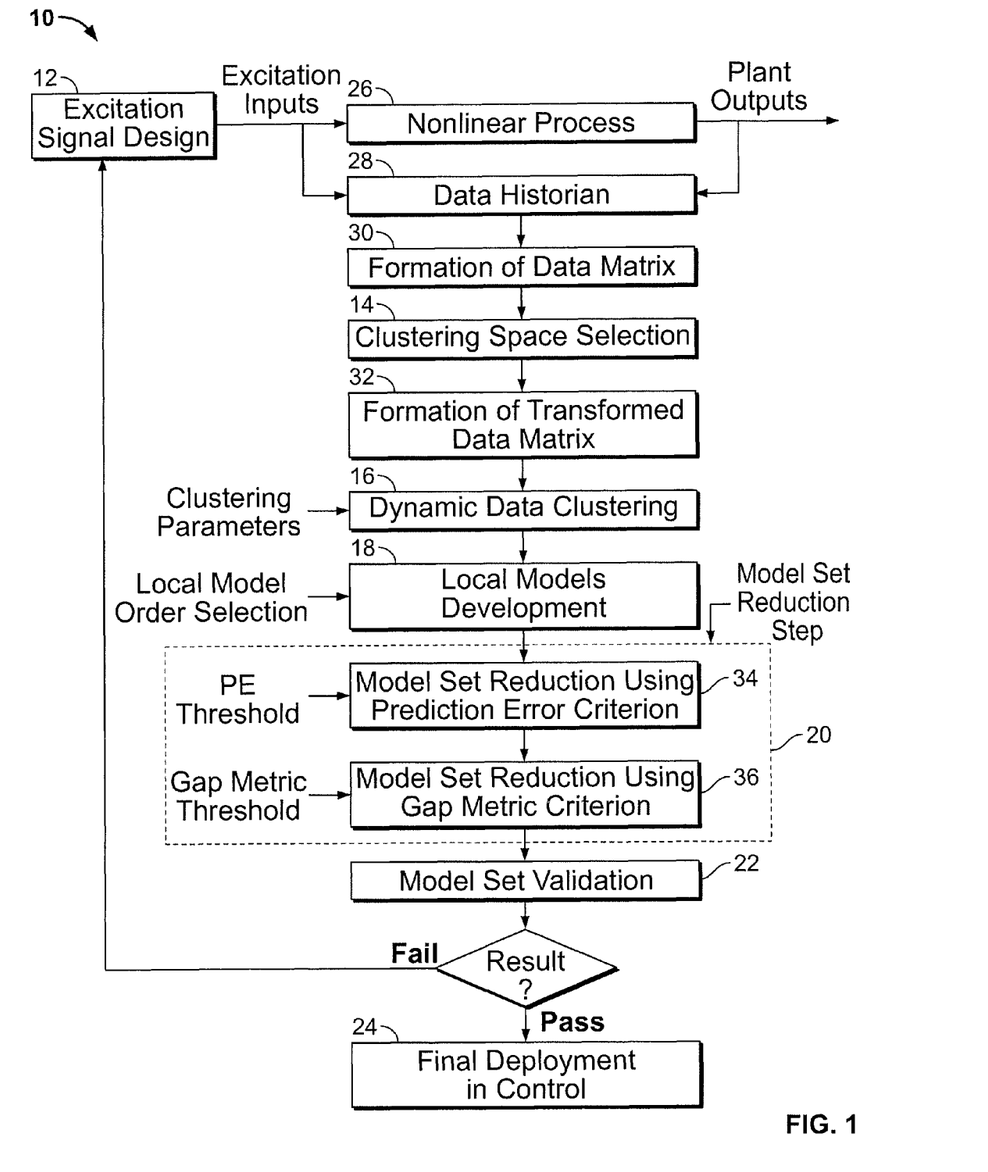
FIG. 1 illustrates an overall model identification process.

An overall model identification process 10 is shown in FIG. 1. The model identification process 10 includes an excitation signal design 12, a clustering space selection 14, a dynamic data clustering 16, a local model development 18, a model set reduction 20, a model validation 22, and a final model set selection and deployment 24.

During the excitation signal design 12, the excitation signals are designed so that all plant operations of a non-linear process 26 are excited. These excitation signals are multilevel signals that are suitable to produce the data necessary for nonlinear model identification. When designing the input excitation signals, care should be taken so that the plant does not exceed safety and stability limits.

The excitation signals produced by the design are then applied as process inputs to the nonlinear process 26, which is to be modeled. These process inputs and the resulting process output data are stored in a data history 28. Typical data cleaning operations, such as outlier detection, missing values correction, data filtering, etc., can be performed on the data as desired.

During the clustering space selection 14, the process inputs and the resulting process output data are first formed at 30 as an untransformed data matrix. Each row of this matrix includes an output y(n) and a corresponding input u(n). Based on this matrix, the clustering space is then defined at 14. The clustering space is defined as the multidimensional data space in which the dynamic data needs to be classified. An algorithm similar to a step wise regression analysis, the latter of which is well known to those skilled in the art, may be applied to the untransformed data matrix in order to decide upon the potential candidates for the clustering space. Typically, the clustering space consists of dimensions representing the past process inputs and the resulting process outputs. Based on the clustering space information, the cleaned plant data in the untransformed data matrix is finally transformed at 32 so that each row of the transformed data matrix has information about the current and past process output and past input values. The columns of this transformed data matrix form patterns that are further classified using fuzzy clustering and classification methods.

During the dynamic data clustering 16, the transformed data matrix is subjected to a data clustering algorithm. The data clustering algorithm can be either the Fuzzy C means algorithm or the Gustafson Kessel algorithm or any other data classification algorithm (well known to those skilled in the art). For the transformed data set, given the clustering parameters (like number of data clusters, convergence criteria, and extent of fuzziness in the data quantified by fuzzy index) of the clustering space defined at 14, these algorithms attempt to identify the optimal locations, shapes, and sizes of the data clusters.

Typically, a feature vector resulting from a data point belongs to all the data clusters, and its membership to any particular data cluster is given by a membership function p which varies between 0-1. Data points, which are similar or close to each other (based on distance measures), are assigned to the same data cluster. Ultimately, the transformed data matrix is partitioned into multiple data clusters with corresponding membership values. Monte Carlo based simulations avoid non-optimal and/or meaningless solutions. The clustering algorithm is simulated with different initial guesses of the membership functions. In effect, the data clustering clusters similar input-output dynamic responses together so that each cluster can form the basis for a corresponding model.

During the local model development 18, the data clusters together with their corresponding dynamic data are separated based on some threshold values of the membership functions. This threshold based data separation is performed so that the resulting local models are not sensitive to process disturbances and noise. Then, the model order for each local model is selected based on the principle of parsimony like AIC (Akaike Information Criterion) criteria (well known to those skilled in the art). For each data cluster, the allocated dynamic data is mapped to a corresponding local model with the provided model order. The model is a set of parameters that will produce a set of outputs for a corresponding set of inputs.

The calculations of the model parameters are based on a prediction error minimization using the least squares method. The least squares method is well known to those skilled in the art and basically is an optimization problem according to which the set of parameters of a model are identified so as to minimize the sum of the squares of the difference between the actual output of the nonlinear process 26 and the predicted output provided by the local model. The region of validity of each local model is represented in terms of the centroid of the local dynamic data set assigned to that data cluster.

Figure 2:
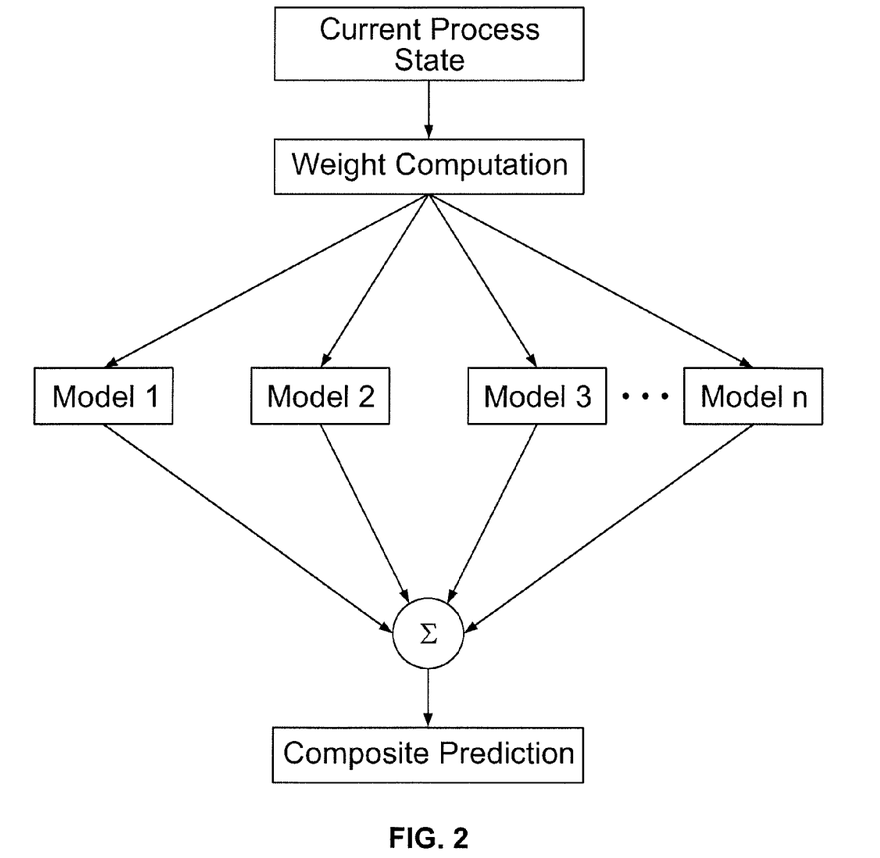
FIG. 2 illustrates depicts computation of composite predictions.

In order to predict the behavior of a nonlinear process for a new set of data, the membership values (which are inversely proportional to the distance of the data points from a given data cluster centroid) are computed for each data point in the data set. The nonlinear dynamics are then represented in terms of composite predictions of the individual local models each weighted by its corresponding membership value. This strategy promotes consistent decomposition of the nonlinear dynamics into simpler linear models, and also permits smooth and bumpless switching between them. FIG. 2 depicts the way the composite predictions are computed.

The model set reduction 20 reduces the set of linear models developed by the model development 18. The model set reduction 20 has two components, a model set reduction 34 using a prediction error criterion, and a model set reduction 36 using GAP metric analysis.

The model set reduction 34 using a prediction error criterion involves removing models from the total set of models. The model set reduction 34 uses a prediction error criterion to remove those local models which have the least impact on the composite prediction error. An iterative procedure for this step is given in FIG. 4, which is discussed more fully below.

The model set reduction 36 using GAP metric analysis applies stability considerations to ensure an additional round of the model set reduction analysis on the set of models provided by the model set reduction 34. The gap metric analysis is used to decide whether two dynamic linear models are similar in nature so that they can be stabilized by a common controller. The gap metric measures the distance between two linear systems from a closed loop stability perspective.

The gap metric has a value that varies between 0-1. A gap metric with a value of 0 indicates that the two linear dynamic systems are very similar to each other, whereas a gap metric with a value of 1 indicates that the two linear systems are very different from each other.

Since it is desired to develop simple local linear models for control, this gap metric is used as a post processing tool for the data clustering algorithm. The models in the model set which are closer to each other (based on gap metric calculations) can be merged without affecting control performance and, hence, the total number of models needed for representing the nonlinear dynamics can be reduced significantly. Such a set of optimally reduced locally linear models would be expected to provide a solid foundation for design and maintenance of the control and optimization problems of the nonlinear processes.

The final model set resulting after the model set reduction 36 is subjected to a model validation test at 22. A new data set which is different than the training data set, is used to validate the predictive abilities of the final model set. If the final model set passes the validation test, these models are deployed for online control at 24. Otherwise, the excitation test signals are redesigned and the complete identification test of FIG. 1 is repeated. The final model set selection and deployment 24 thus ensures the closed loop stability as well the good prediction power of the selected set of the local models. The final model set selection and deployment 24 deploys the final set of local models to a controller for control of the nonlinear process 26.

More specifically, the excitation signal design 12 designs the excitation signals off line. The nonlinear process 26 needs to be perturbed over a broad range so that the process dynamics are excited across all of the operating regimes in which the nonlinear process 26 is expected to be operated. The quality of the identified dynamics of the nonlinear process 26 strongly depends on the quality of the excitation signals employed for perturbation. The identification exercise is a time consuming and expensive step and, therefore, these excitation signals need to be carefully designed.

Typically, excitation signals used for linear identification involves pseudo random binary signals or Gaussian binary signals which vary between two appropriately chosen levels. Therefore, the design of excitation signals for linear identification involves the suitable selection of the frequency spectra and an amplitude of these signals.

However, for nonlinear identification, the excitation signals need to have a spectra of amplitudes (multilevel signals) as well as a spectra of frequencies to capture the process nonlinearity. Typically, staircase signals or multisine signals are known to have this feature. Moreover, pseudo random binary signals or Gaussian binary signals can be modified to have multiple amplitude levels. Any of these signals can be used for nonlinear process identification.

Figure 7:
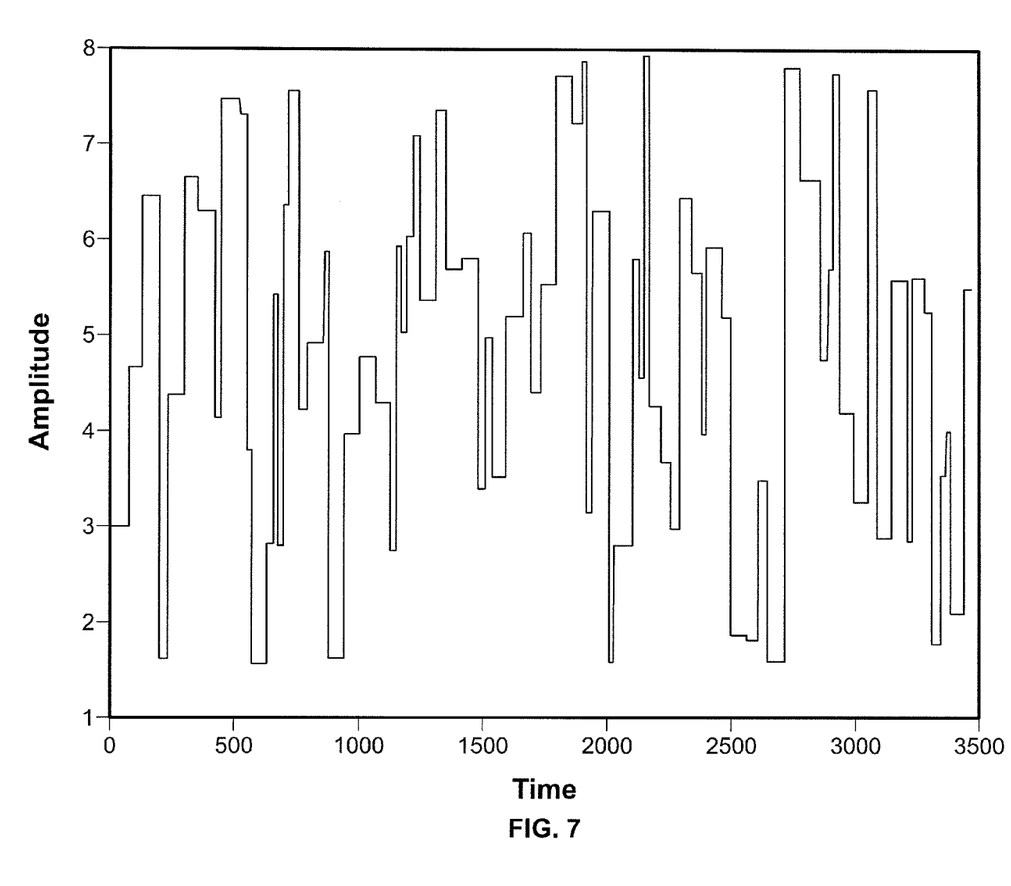

The amplitude band for these signals is determined by the range of dynamics that needs to be identified and the dominant process gains. The frequency band of these signals is determined by the range of time constants of the process over the intended range of process operation. The number of levels in the excitation signals should be greater than the highest degree of process nonlinearity (which is well known to those skilled in the art). In practice, the degree of process nonlinearity is difficult to determine. Therefore, the excitation signals should have roughly 10-15 different levels of signal amplitudes. Preferably, but not necessarily, the average switching time of the excitation signals should vary between (10% to 100% of the process settling time), and the identification test duration should be around 10-25 times the dominant settling time of the process. Preferably, but not necessarily, the multiple manipulated variables (MVs) of the nonlinear process 26 should be perturbed simultaneously to reduce the identification test time as well as to capture plant directionalities. However, process safety considerations must be respected while simultaneously perturbing multiple manipulated variables (MVs). The design of the excitation signals can be refined and corrected by model validation tests. FIG. 7 illustrates an example of such excitation signals.

In order for the clustering space selection 14 to define the clustering space, the plant data comprising the CV-MV-DV variables are subjected to data cleaning. Data cleaning typically involves outlier removal, data pre-filtering for the suppression of process noise, and data scaling.

The cleaned plant data is then partitioned into two data sets, a training data set and a validation data set. The training data set is used for the development of the local models, and the validation data set is used for the testing of the validity of the identified local models. Typically, 60% of the data points can be used for model development, and 40% of the data points can be used for model validation. This split ratio can differ from case to case. For example, the first 60% of the data points can be used for model development, and the last 40% of the data points can be used for model validation. An input and its corresponding output constitutes a data point.

The cleaned process data needs to be partitioned in order to generate the multiple linear models. Such partitioning is preferably carried out in an appropriate data space comprised of different lags of the manipulated variables (MVs), disturbance variables (DVs), and controlled variables (CVs) so that the dynamic behavior of the nonlinear process 26 is captured properly. The appropriate data space is defined as the dynamic clustering space (DCS). The choice of the dynamic clustering space is dependent on the presence of delays and the nature of the dynamics of the local regions.

Figure 5:
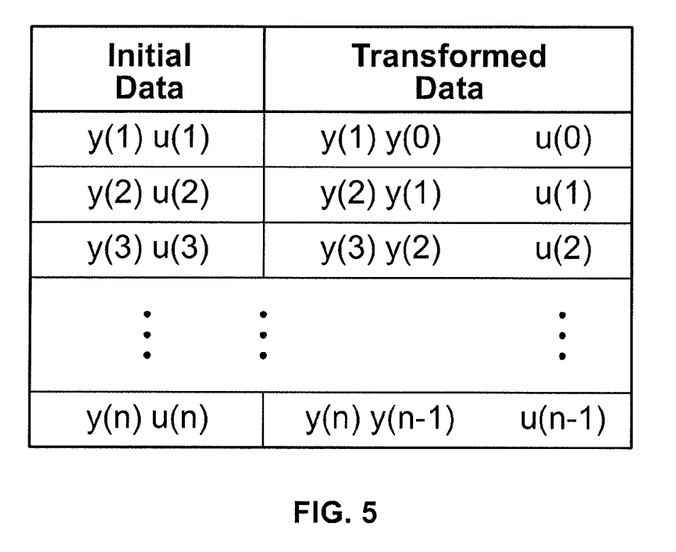
FIG. 5 depicts an illustrative data transformation matrix in the form of a table.

A lag is a delayed version of a signal which affects the current output. For example, in connection with the transformed data matrix of FIG. 5, an output y(n) at instant n is dependent on the output y(n−1) at the past instant n−1 in time and the input u(n−1) at the past instant n−1. Therefore, in this example, there is a lag of 1 unit with respect to the output and 1 unit with respect to the input. The lagspace comprises the [y(n) y(n−1) u(n−1)] 3-dimensional space in this example. In practice, any lag with respect to an input and any lag with respect to the output can be chosen. If the lag is more than 1, additional columns will appear in the transformed data matrix of FIG. 5. The left hand side of FIG. 5 shows the untransformed data.

To estimate the delays over all the partitioned regions, either graphical methods, which are based on step or impulse responses of the process, or more advanced methods, which are based on generalized orthogonal basis filters (GOBF), can be used. (These methods are well known to those skilled in the art).

Further, the number of lags in the dynamic clustering space can be determined based on a step-wise regression method. In the case of determining the number of lags in the dynamic clustering space based on prediction error, the lags are determined in accordance with the delay matrix which is estimated either by graphical or GOBF based methods as discussed above.

Figure 3:
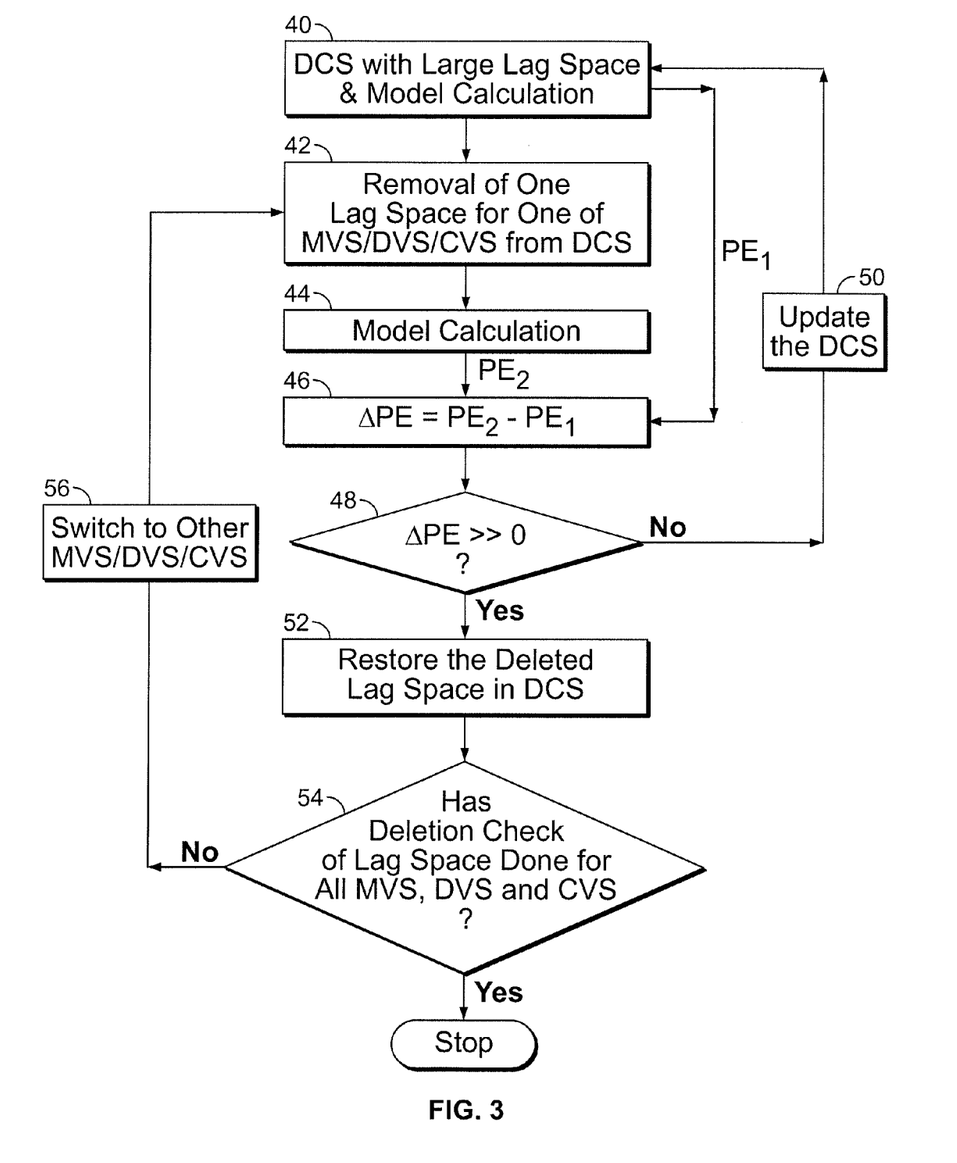
FIG. 3 is a flowchart illustrating a procedure for determining the number of lags in the dynamic clustering space based on a step-wise regression.

FIG. 3 is a flowchart illustrating a procedure for determining the number of lags in the dynamic clustering space based on a step-wise regression. As shown in FIG. 3, this procedure is iterative and is also implemented to determine the optimal dynamic clustering space.

To start with, a dynamic clustering space, guided by the delay matrix, is determined and a linear model is calculated based on this dynamic clustering space at 40 using the well known least squares method. Also at 40, the corresponding prediction error $PE_1$ is noted as the difference between the actual output of the process 26 and the predicted output provided by the linear model calculated at 40 for a given input.

The linear model is calculated based on the least squares method. The row of the transformed data matrix (based on the dynamic clustering space) is used as the regressor in estimating the parameters of the local model.

At 42, the lag space corresponding to one set of manipulated variables (MVs), disturbance variables (DVs), and controlled variables (CVs) of the process 26 is deleted from the dynamic clustering space. At 44, an updated model is calculated with the updated dynamic clustering space, and the corresponding prediction error $PE_2$ is noted. At 46, the delta prediction error is determined as the difference between $PE_2$ and $PE_1$. If the delta prediction error is not much greater than zero as determined at 48, then the lagspace deletion at 42 is accepted and the dynamic clustering space as updated by the deletion of this lagspace is taken at 50 as the starting point for further lag reduction steps and flow returns to 40.

However, if the delta prediction error is much greater than zero as determined at 48, the lag space that was deleted at 42 is restored at 52 to the dynamic clustering space. If the lagspaces corresponding to all sets of manipulated variables (MVs), disturbance variables (DVs), and controlled variables (CVs) have not been checked for deletion from the dynamic clustering space as determined at 54, then flow switches to another lagspace at 56, flow returns to 42, and the process is repeated for all other lag spaces. Thus, the process of FIG. 3 is repeated until optimal lags for each of the manipulated variables (MVs), disturbance variables (DVs), and controlled variables (CVs) are identified. When the lags of all inputs or outputs have been deleted from the dynamic clustering space as determined 54, the process of FIG. 3 terminates.

It should be noted that the aforesaid method is explained for the sake of illustration. It may be possible to use any other criterion for optimal dynamic clustering space selection.

The dynamic data clustering 16 (FIG. 1) uses the dynamic clustering space selected as described above in connection with FIG. 3 to modify the MV-DV-CV data so that each row of the new data matrix represents a data point in the clustering space. A typical data transformation is illustrated in the table of FIG. 5 for the case of a single input and a single output with a dynamic clustering space of 1 with respect to the input and 1 with respect to the output and having delay of 2 units. As indicated above, u represents an input (MV/DV) and y represents an output (CV) of a data point.

Having fixed the dynamic clustering space, the next steps are related to data clustering and local model development in each cluster. This modified dynamic data (shown by way of example as the transformed data in FIG. 5) is subjected to a fuzzy clustering algorithm. The objective of the fuzzy clustering algorithm is to identify the local regions wherein a linear/simple nonlinear model can be fitted. This fuzzy clustering algorithm enables the division of the complex nonlinear spaces into elementary subspaces. This fuzzy clustering algorithm also ensures an overlap of the subspaces in order to represent the nonlinear behavior in transition regions. The data points having a similar dynamic relationship are clustered together. The mathematical formulation of this fuzzy clustering algorithm can be stated according to equations (1)-(7) below.

Let X be the matrix containing the transformed input-output data points (as discussed earlier), let N be the number of dynamic data points, let c be number of data clusters, let $\mu_{ij}$ be the membership value of a data point i to a data cluster j, let $V_k$ be the center of a data cluster k, and let m be the fuzzy exponent. The fuzzy partitioning of the transformed input-output data points into data clusters involves minimization of a fuzzy objective function J given by the following equation:

$$J = \sum_{i=1}^{c} \sum_{j=1}^{N} (\mu_{ij})^m \|X_j - V_i\|^2 \quad (1)$$

where $$\|X_j - V_i\|^2 = (X_j - V_i) M_i (X_j - V_i)^T \quad (2)$$

$$\mu_{ij} \in (0, 1) \quad (3)$$

$$\sum_{i=1}^{c} \mu_{ij} = 1 \quad \forall j = 1 \ldots N \quad (4)$$

$$0 < \sum_{i=1}^{N} \mu_{ij} < N \quad \forall i = 1 \ldots c \quad (5)$$

$$M_i = \left[\rho_i \det(F_i)^{\frac{1}{p}} (F_i)^{-1}\right] \quad (6)$$

$$F_i = \frac{\sum_{j=1}^{N} (\mu_{ij})^m (X_j - V_i)}{\sum_{j=1}^{N} (\mu_{ij})^m} \quad (7)$$

where $\rho$ is a scaling factor for the cluster volume and is generally set to 1, $p=x-1$, x is the dimensionality of the dynamic clustering space, and $\mu_{ij}$ is determined iteratively by solving equations (1)-(7).

These equations are for a generic fuzzy classification algorithm. Equation (2) calculates the distance between a data point and the cluster center in the clustering space. The constraint imposed by equation (4) ensures that the total membership value of each data point is unity, while the constraint imposed by equation (5) ensures that no data cluster is empty.

The problem formulated by equations (1)-(7) is highly nonlinear and, therefore, is preferably solved in an iterative manner such as provided by the well known Gustafson-Kessel algorithm. However, the fuzzy clustering algorithm as solved using the Gustafson-Kessel algorithm can get trapped in a local optimal solution. Therefore, the fuzzy clustering is preferably carried out by Monte Carlo simulations.

Monte Carlo simulation runs this algorithm with different initial guesses of the initial membership matrix U comprising the $\mu_{ij}$ terms. The chances of locating the globally optimal partition are also improved. Sometimes, it is good to simplify the algorithm by assuming $M_i$ as the identity matrix. This simplified algorithm is called Fuzzy C means clustering (FCM), which is well known to those skilled in the art.

Therefore, dynamic data clustering can be done using any of the algorithms which have a formulation similar to that mentioned above. It should be noted that the number of data clusters to be identified (c) has to be provided to the optimization formulation. However, in practice, this information is not available a priori. Accordingly, the fuzzy clustering algorithm may be initiated with a large number of data clusters (roughly $\frac{1}{20}^{th}$ of the data size), and then the cluster merging is done at a later stage.

The aforesaid clustering algorithms provide c data clusters along with the corresponding partition matrix U defining the separation between the data clusters.

During the local model development 18, the local models are developed for each data cluster. Towards this model building, data points with a degree of membership value greater than a fixed threshold are considered for each data cluster. This thresholding enables noisy data points to be filtered out so that only those data points which are relevant to the data cluster are considered. Model order selection has to be judiciously carried out to develop good quality models. This judicious model order selection can be done using AIC (Akaike Information Criterion) or any similar criterion. Otherwise, a series of model orders can be chosen, and the local model that provides the best prediction capabilities can be chosen as the local model order. The parameters of the local model can be identified by the least squares method (again well known to those skilled in the art).

The c number of models (one model per cluster) obtained as described above need to be suitably aggregated to predict the actual output of the nonlinear process 26. When the nonlinear process 26 is operating in the region corresponding to a data cluster, the model corresponding to this data cluster will predict the behavior of the nonlinear process 26 well. When the nonlinear process 26 is in a transition phase, then a combination of the local models will predict the behavior of the nonlinear process 26 well. To facilitate this prediction, the membership value for each of the data points is computed and then the local model predicted output is weighted by the fuzzy cluster-wise membership value in accordance with the following equation:

$$Y = \frac{\sum_{j=1}^{N} (\mu_{ij})^m Y_i}{\sum_{j=1}^{N} (\mu_{ij})^m} \quad (8)$$

where $$\mu_{ij} = \frac{1}{\sum \left[\frac{\|X_j - V_i\|^p}{\|X_j - V_k\|^p}\right]^{\frac{1}{m-1}}} \quad (9)$$

and where Y is the aggregated prediction output, $Y_i$ is the prediction output of model i obtained in cluster i. FIG. 2 depicts the calculation of the aggregated prediction output.

As discussed above, the fuzzy clustering algorithm is performed using a large number of data clusters so that the prediction error is minimal. However, the selection of the number of data clusters has to be done judiciously. If a large number of data clusters are selected, the composite prediction model will capture the process nonlinear behavior very well (low prediction error). But, such a composite model, comprising large number of local models, is difficult to deploy for controller design. The maintenance of the controller also becomes prohibitively complex.

Therefore, the model set reduction 20, using the prediction error model set reduction 34 and the GAP metric model set reduction 36, reduces the number of models so that the underlying controller becomes simpler. For the case of a large number of models, the identified models are also very similar to each other, and there is the possibility of merging some of the models without significantly affecting the prediction quality of the composite models. However, merging of the data clusters has to be done while keeping in mind the intended end use of the models, i.e., closed loop control.

Therefore, the decision of selecting the optimal number of data clusters has to involve closed loop stability issues as well as prediction error based model quality issues.

Figure 4:
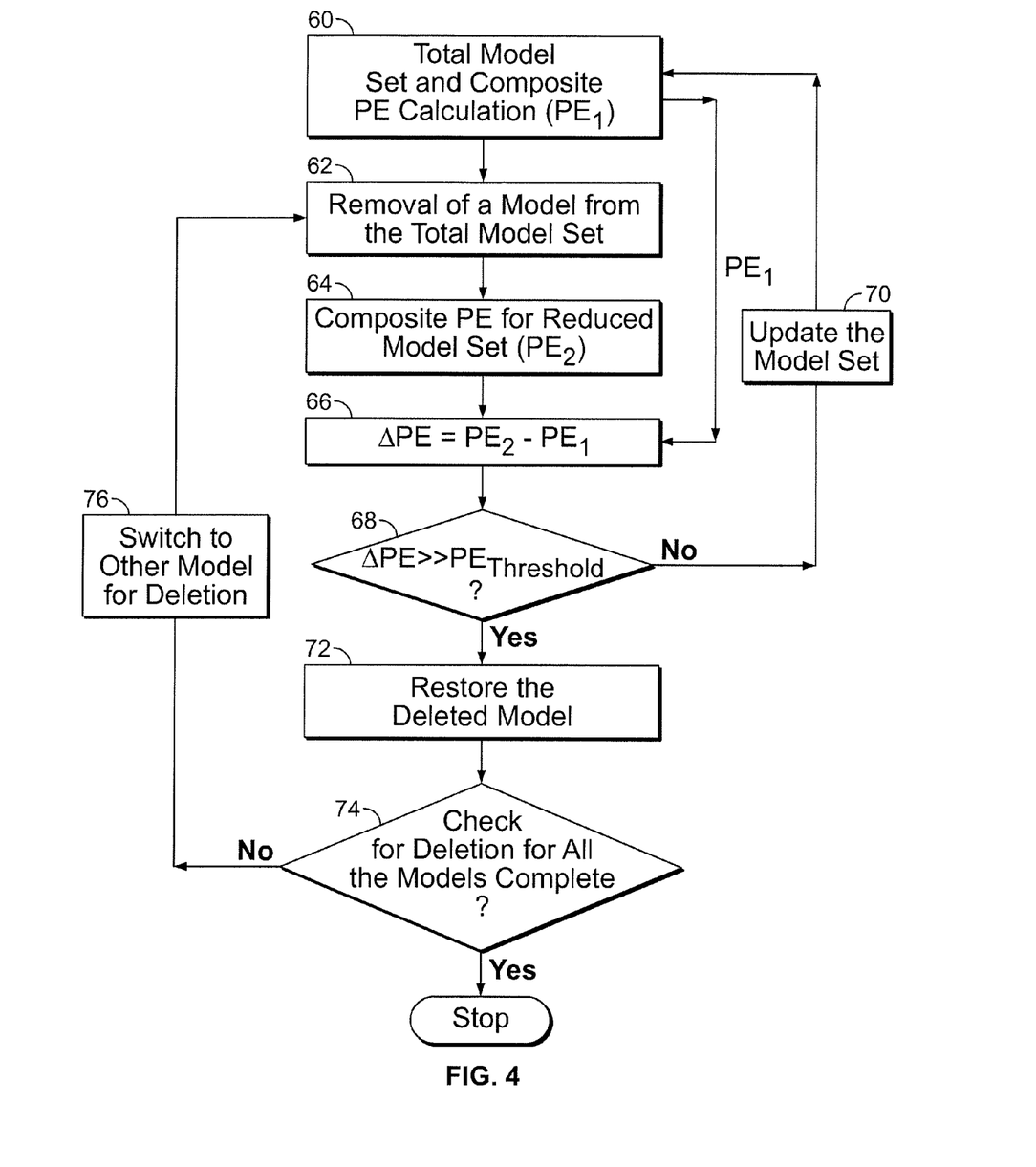
FIG. 4 illustrates an iterative procedure for performing model set reduction based on a prediction error.

The model set reduction 34 using a prediction error criterion operates shown in FIG. 4. The composite prediction error $PE_1$ of the reduced set of the models is computed at 60 on the validation data set. One of the models is removed from the total model set at 62, and a composite prediction error $PE_2$ is calculated for the resulting model set at 64. At 66, the delta prediction error is determined as the difference between $PE_2$ and $PE_1$. If the delta prediction error is not much greater than a predetermined threshold $PE_{threshold}$ as determined at 68, then the model removal at 62 is accepted and the reduced model set is accepted at 70 as the starting point for further model removal and flow returns to 60.

However, if the delta prediction error is much greater than the predetermined threshold $PE_{threshold}$ as determined at 68, the model that was removed at 62 is restored at 72 to the model set. If all models in the model set have not been checked for removal as determined at 74, then flow switches to another model at 76, flow returns to 62, and the process is repeated for all other models. Thus, the process of FIG. 4 is repeated until an optimal model set is identified. When all models have been removed as determined 74, the process of FIG. 4 terminates.

The criterion on the prediction error threshold $PE_{threshold}$ can be chosen in terms of a certain percentage deviation of prediction error from the full model set case.

As to closed loop stability issues, the model set reduction 36 using GAP metric analysis is used. The gap metric is the calculated distance between two dynamic systems from the view point of closed loop stability. Typically, the gap metric $\delta$ for two dynamic models P1 and P2 can be calculated as given by the following equation:

$$\delta(P_1, P_2) = \sup_\omega \frac{|P_1(j\omega) - P_2(j\omega)|}{\sqrt{1 + |P_1(j\omega)|^2}\sqrt{1 + |P_2(j\omega)|^2}} \quad (10)$$

where $0 \leq \delta \leq 1$, where sup means maximum value over the complete range of $\omega$, and where $P_1(j\omega)$ and $P_2(j\omega)$ represent the frequency responses of the systems $P_1$ and $P_2$, respectively. If the gap metric $\delta$ is close to 0, the two models $P_1$ and $P_2$ are similar and can be merged. However, if the gap metric $\delta$ is close to 1, the two dynamic models $P_1$ and $P_2$ behave differently when placed in a control loop and cannot be merged. It should be noted that the gap metric $\delta$ can be computed in a variety of ways, and this computation of the gap metric $\delta$ as given in equation (10) is just an illustration case.

The model set reduction 36 using gap metric analysis for data cluster merging is applied after the model set reduction 34 using prediction error.

The fuzzy clustering algorithm is initiated with a large number of data clusters (roughly $1/20^{th}$ of the data size). The fuzzy classification algorithm partitions the dynamic data into multiple data clusters. The data in each data cluster is then used to calculate the local model. Model order selection has to be judiciously carried out to develop good quality models. This selection can be done using AIC (Akaike Information Criterion) or any similar criterion. Otherwise, a series of model orders can be chosen and the local model providing best prediction capabilities can be chosen as the local model order.

The gap metric analysis is performed on the series of local models to compute the gap matrix (G) of dimension c by c, wherein $G_{i,j}$ represents value of the gap metric $\delta$ between models i and j, respectively. The gap matrix is given by the following equation:

$$G = \begin{bmatrix} G_{1,1} & G_{1,2} & \cdots & G_{1,r} \\ G_{2,1} & G_{2,2} & \cdots & G_{2,r} \\ \vdots & \vdots & \vdots & \vdots \\ G_{r,1} & G_{r,2} & \cdots & G_{r,r} \end{bmatrix} \quad (11)$$

The diagonal entries in the G matrix of equation (11) will, of course, be zeros, and the G matrix will be symmetrical in nature as $G_{i,j} = G_{j,i}$.

Once the G matrix is computed, the matrix is scanned for models which can be merged. A value for a gap metric threshold $\delta$ represented as $\delta_{threshold}$ is chosen based on the stability sensitivity of the nonlinear process under consideration. Typically, $\delta_{threshold}$ varies between 0 to 0.5, where a $\delta_{threshold}$ of 0 indicates the no model merging case and progressively increasing values of $\delta_{threshold}$ towards 0.5 indicates an increasingly relaxed stability norm consideration for model merging. Selection of $\delta_{threshold}$ for model merging is quite subjective, and can change from case to case.

Based on $\delta_{threshold}$, the set of local models to be merged are identified. The local data in the corresponding data clusters are merged, and the model parameters are recalculated based on the merged data set in order to obtain a new local model. The new local model replaces the two merged models, and the membership value of a data point to the new local model is the sum of membership values of the data points to the merged models. Using the updated membership function, the composite prediction of the merged model set is computed as per equation (8).

It should be noted that the threshold selection criteria for gap metric analysis and prediction error analysis are representative ones and can be generalized to any other similar criteria. The composite predictions provided by equation (8) can be used for offline model prediction. The reduced set of models so identified can be used for prediction in a controller calculation. However, for online purposes, the same strategy cannot be used. In order to compute the membership value of a data point ($\mu_{ij}$) in equation (9), knowledge of all of the attributes of the dynamic clustering space is required. One of the dynamic clustering space attributes is the output which is not known in online applications. In order to circumvent this problem, either of the two strategies can be deployed.

In a first strategy, the cluster parameters are projected onto the known dynamic clustering space (dynamic clustering space without the output feature) and the membership values are computed in this space and used in equation (8).

In a second strategy, it is assumed that the output values would not change significantly between a control execution time interval. Therefore, past values of plant output can be used as the current output values, and the membership value is calculated as per equation (9). This assumption is reasonable for chemical processes, which are inherently sluggish in nature.

Figure 6:
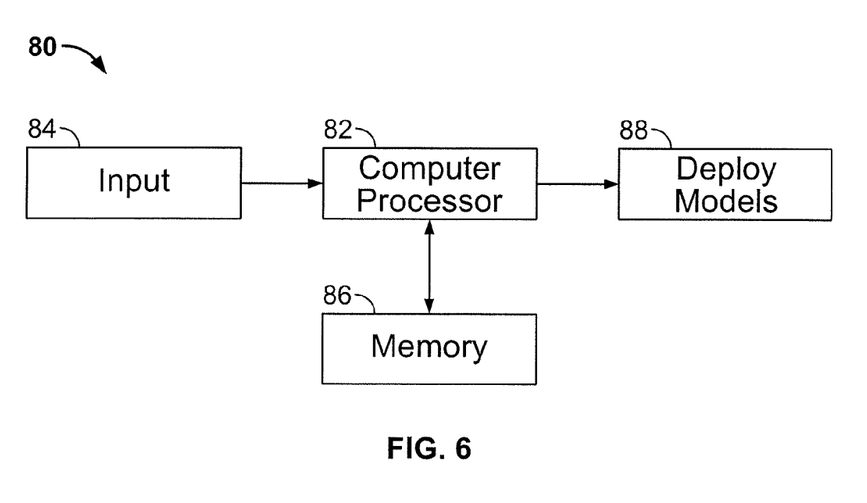
FIG. 6 is an example of a computer system useful in deploying the models for controlling a process; and, FIG. 7 illustrates an example of excitation signals useful in connection with FIG. 1.

FIG. 6 is an example of a computer system 80 useful in developing and deploying the models as described above. The computer system 80 includes a processor 82 that receives the historical data 24 by use of an input 84. The computer system 80 includes a memory 86 that stores the routines of FIGS. 1-3 as described above for developing and deploying the final-model set 88.

Modifications of the present invention will occur to those practicing in the art of the present invention. Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

We claim:

1. A computer implemented method of developing multiple models adapted for various stages of a non-linear process control comprising:
   (a) computer clustering dynamic data of a data set so as to permit multiple local data regions to be identified as a function of substantial similarity between the data within the local data regions, wherein the data in the data set represents dynamic behavior of the non-linear process;
   (b) computer developing a discrete model corresponding to each of the local data regions;
   (c) computer reducing the number of the discrete models based on a prediction error between actual outputs and predicted outputs provided by the discrete models in response to corresponding inputs and based on a stability similarity between pairs of discrete models thereby producing a reduced model set; and,
   (d) computer selecting at least some of the models in the reduced model set for deployment.

2. The method of claim 1 wherein the computer reducing of the number of the discrete models comprises:
   computer reducing the number of the discrete models according to a prediction error between actual outputs and predicted outputs provided by the discrete models in response to corresponding inputs thereby producing a first reduced model set;
   computer reducing the number of the discrete models in the first reduced model set according to a gap metric based on a stability similarity between pairs of discrete models thereby producing a second reduced model set; and,
   computer validating the second reduced model set for deployment.

3. The method of claim 1 wherein the computer reducing of the number of the discrete models according to a gap metric comprises computer reducing the number of the discrete models according to a gap metric based on a closed loop stability similarity.

4. The method of claim 1 wherein the computer reducing of the number of the discrete models according to a gap metric comprises computer reducing the number of the discrete models based on a similarity of frequency responses between pairs of discrete models.

5. The method of claim 1 further comprising computer validating the discrete models in the reduced model set.

6. The method of claim 5 wherein the data set comprises first and second data sets, wherein the computer clustering of the data comprises computer clustering only the data of the first data set, and wherein the computer validating of the discrete models in the reduced model set comprises validating the discrete models in the reduced model set with the second data set.

7. The method of claim 1 further comprising computer generating the data set in response to a predetermined input, wherein the predetermined input comprises a spectra of amplitudes and a spectra of frequencies sufficient to capture the nonlinearity of the non-linear process.

8. The method of claim 1 wherein the computer selecting of at least some of the models in the reduced model set for deployment comprises computer selecting all of the models in the reduced model set for deployment.

9. The method of claim 1 wherein each of the discrete models comprises a linear model.

* * * * *